United States Patent [19]
Wang et al.

[11] Patent Number: 5,265,068
[45] Date of Patent: Nov. 23, 1993

[54] EFFICIENT GENERATION OF TRAVELTIME TABLES FOR COMPLEX VELOCITY MODELS FOR DEPTH MIGRATION

[75] Inventors: Shein S. Wang; Douglas W. Hanson, both of Ponca City, Okla.

[73] Assignee: Conoco Inc., Ponca City, Okla.

[21] Appl. No.: 994,791

[22] Filed: Dec. 21, 1992

[51] Int. Cl.$^5$ .............................................. G01V 1/28
[52] U.S. Cl. ..................................................... 367/73
[58] Field of Search ............................ 367/38, 50-54, 367/73

[56] References Cited

U.S. PATENT DOCUMENTS

| | | | |
|---|---|---|---|
| 4,839,869 | 6/1989 | Corcoran | 367/53 |
| 4,964,088 | 10/1990 | Chittineni | 367/51 |
| 5,067,113 | 11/1991 | Hanson et al. | 367/50 |

Primary Examiner—Ian J. Lobo
Attorney, Agent, or Firm—M. Kathryn Braquet Tsirigotis

[57] ABSTRACT

The present invention provides a method for rapidly and efficiently generating traveltime tables from complex velocity models for application in depth migration. Initially, a velocity model is received which may include a plurality of velocities with various subsurface reflectors or boundaries. The model is plotted with the boundaries defining closed area cells within the model, with the cells having given velocity structures. The outside of each cell, or the cell wall, is made up of a series of segments. In the first basic step, traveltimes are computed from a preselected source location to each sample point on each segment. In this step, the order of processing all the cells is important. Therefore, the present method proceeds from those cells that are closest to the source location first to those cells that are further away in an expanding wave front from the source location. In the second basic step, the model is plotted on a two dimensional grid and the traveltime to each grid point inside each cell is generated using traveltime values from the segments surrounding the cell. The sample points on the surrounding segments are used as secondary sources and traveltimes are determined from these secondary sources to each grid point within the cell. In this step, the order of processing cells is arbitrary.

4 Claims, 3 Drawing Sheets

EFFICIENT GENERATION OF TRAVELTIME TABLES FOR COMPLEX VELOCITY MODELS FOR DEPTH MIGRATION

BACKGROUND OF THE INVENTION

1. Field of the Invention

The present invention relates to determining traveltimes for seismic energy and more particularly to generating source and receiver traveltime tables very efficiently for complex velocity models so that depth migration can be economically performed.

2. Related Prior Art

Prior art has illustrated many ways for producing traveltime tables. Traveltime tables are usually generated by shooting a fan of rays and interpolating between the rays. There have been problems with critical angles in prior methods. There have also been difficulties in prior methods for complex velocity models wherein velocity boundaries are not layered and do not follow a natural up and down order, or where the models do not fit a simple grid image.

At present, the source and receiver traveltime tables are generated by shooting a fan of rays and traveltimes are obtained by recording the traveltimes along the ray path. The complete traveltime table is then obtained by interpolation. Prior art examples of this type of ray tracing to obtain traveltime tables is illustrated in the following United States patents.

U.S. Pat. No. 5,067,113 entitled "Efficient Generation of Traveltime Tables for Two Dimensional and Three Dimensional Prestack Depth Migration", (Hanson, Wang, Harlan) relates to a method for generating traveltime tables for application in depth migration which uses a velocity model which includes a plurality of velocities in multiple layers between various subsurface reflectors. The model is plotted on a two dimensional grid with the subsurface reflectors identified. A traveltime to the first reflector is determined. Traveltimes from the sources on each layer boundary to all grid points above the next reflector are determined. The method determines the minimum traveltime from the source to each layer boundary proceeding from the surface downward. The traveltime to each layer boundary is determined from that of the overlying layer boundary. Therefore for layers below the surface, there will be more than one source or secondary source.

U.S. Pat. No. 4,839,869 entitled "Methods for Processing Converted Wave Seismic Data", (Corcoran) relates to methods for processing converted wave seismic data which includes, fractional point gathering of the data in a manner consistent with a selected velocity model, dynamic correction of the data using parameters measured from the data to account for the asymmetric travel path of the converted wave rays and stacking the dynamically corrected data. Methods are also provided for updating the velocity model.

U.S. Pat. No. 4,964,088 entitled "Method for Tomographically Laterally Varying Seismic Data Velocity Estimation", (Chittineni) relates to a method for velocity estimation of seismic data using seismic tomography processing. The method uses traveltime inversion tomography wherein the reflectors for each source and receiver pair are picked from prestack seismic data. This is a method for velocity estimation and analysis wherein the seismic section is divided into cells of preselected sizes with each rectangular cell assigned a different velocity function based on the velocities on its four corners. Beginning with a depth model, traveltimes are computed by tracing rays, and subsequently the parameters of the model are updated by comparing the estimated traveltimes with the true traveltimes. The two sets of traveltimes are compared and the differences used to update the model velocities until convergence criterions are satisfied. The final velocity model can then be used for other processes such as depth migration.

SUMMARY OF THE INVENTION

The present invention provides a method for rapidly and efficiently generating traveltime tables from complex velocity models for application in depth migration. Initially, a velocity model is received which may include a plurality of velocities with various subsurface reflectors or boundaries. The model is plotted with the boundaries defining closed areas or cells within the model, with the cells having given velocity structures. The boundary of each cell, or the cell wall, is made up of a series of segments. A boundary is comprised of one or more segments. A segment is the portion of the boundary lying between the intersection points of the boundary with other boundaries. A segment can be further divided into several segments by a series of points where the slope of the segment changes discontinuously.

The present method of traveltime calculation contains basically two steps. The cells are identified in the velocity model, with each cell having a given velocity structure and having cell walls which are divided into segments defined by the subsurface boundaries. In the first basic step, each segment is subdivided into a series of closely spaced sample points. Then traveltimes are computed from a preselected source location to each sample point on each segment. In this step, the order of processing all the cells is important. Therefore, the present method proceeds from those cells that are closest to the source location first to those cells that are further away in an expanding wave front from the source location.

In the second basic step, the model is plotted on a two dimensional grid and the traveltime to each grid point inside each cell is generated using traveltime values from the segments surrounding the cell. The sample points on the surrounding segments are used as secondary sources and traveltimes are determined from these secondary sources to each grid point within the cell. In this step, the order of processing cells is arbitrary.

Prior ray tracing methods have the rays pass all chosen segment points in addition to all grid points, which means a very large number of rays. This is because a ray that passes one of these points will in general not pass too many other such points. In the present method, a small number of rays is used entering each cell at the chosen incident sample points. These rays are interpolated within the cell so that every exit point and every grid point within each cell is hit. Thus, ray segments, not the whole ray, are locally generated where they are needed, making computation very efficient.

DESCRIPTION OF THE PREFERRED EMBODIMENT

The source and receiver traveltime tables are generated by shooting a fan of rays and the traveltimes are obtained by recording the traveltimes along the ray path. The complete traveltime table is then obtained by interpolation. This method can provide traveltimes for any depth point (x,z). In the present method, minimum travel times are determined from a source location to a grid of image locations for complex velocity models. A small number of rays enter every cell at the chosen incidence points. These rays are then interpreted within the cell so that every exit point and every grid point within the cell is hit. Thus ray segments, not the whole ray, are locally generated where they are needed, making computations for complex velocity models very efficient.

The following terms are used in describing the present method. A boundary is a continuous geologic horizon and is comprised of one or more segments. A segment is the portion of a boundary lying between the intersection points of the boundary with other boundaries. A segment can be further divided into several segments by a series of points where the slope changes discontinuously. A cell is a closed area within the model having a given velocity structure. The outside of each cell is made up of a series of segments and is referred to as the cell wall. The cell wall may or may not represent a velocity discontinuity. Segments on the outside edge of the model are owned by one and only one cell. All other segments are owned by two and only two cells. Each segment is represented by a series of evenly sampled points, usually about one half shot interval or one half output trace interval apart, whichever is less. If the dimensions of the cells sharing the segment are small, the segment is sampled more finely. The density of points is adjusted locally so that Snell's Law can be followed.

The following additional terms are also used in describing the present method. The incidence side of a segment is the side first reached by an expanding wave front from a source. The refraction side of the segment is the opposite side. The ray incidence angle is the angle of a ray normal to the wave front surface on the incidence side of the segment. The refraction angle is the angle of a ray normal to the wave front surface on the refraction side of the segment. The refraction angle can be determined from the incidence angle using the velocity on each side of the segment in Snell's Law.

Figure 1:
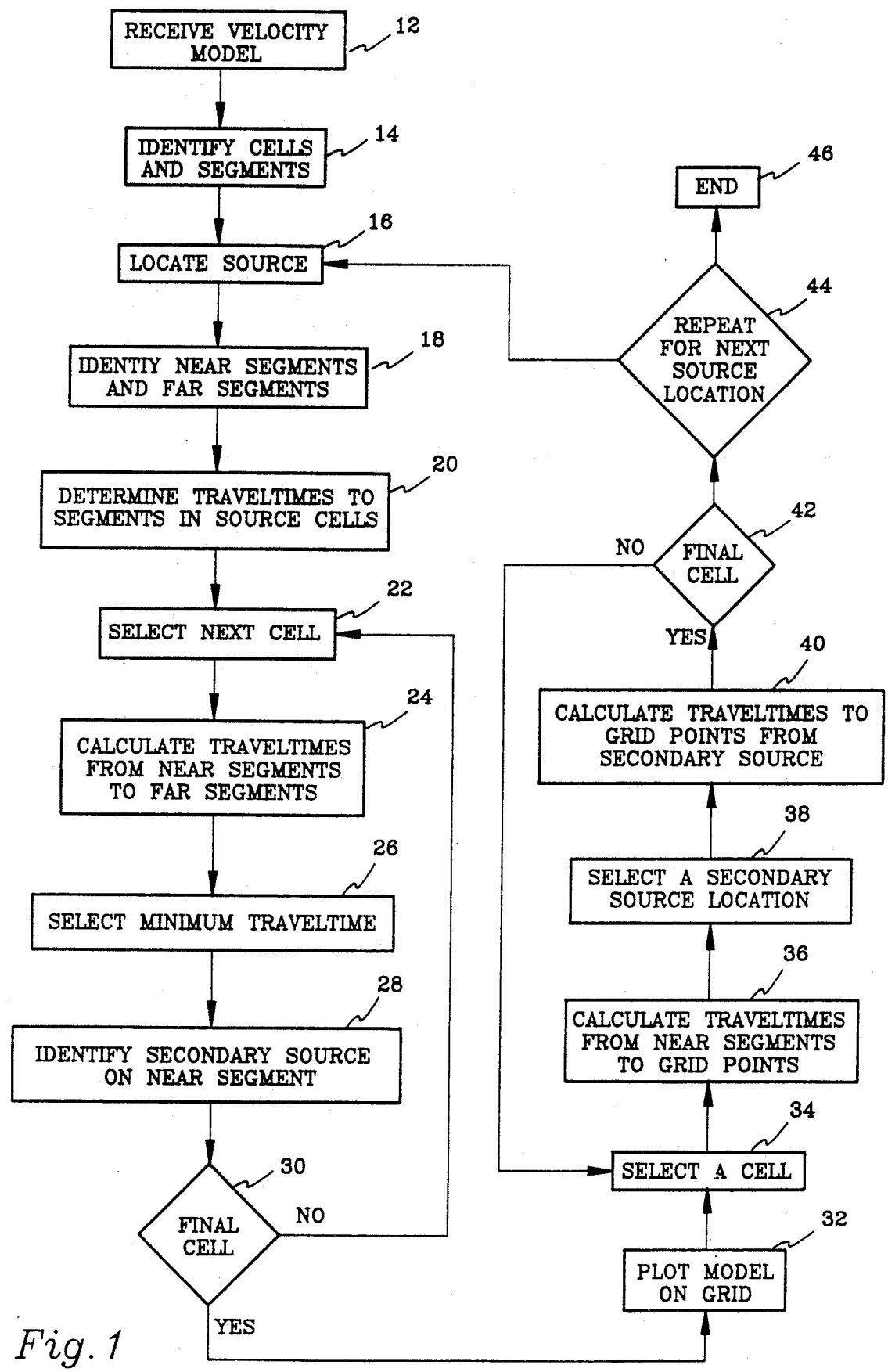
FIG. 1 is a flowchart in block form illustrating the method of the present invention.

As illustrated by the block diagram in FIG. 1, the present method of traveltime calculation contains basically two steps. In the first step, the traveltimes are computed from a source point to each point on each segment, keeping track of the direction from which the minimum traveltime was found. The incidence angles onto the segments are recorded, and the refraction angles from the segments are computed according to Snell's Law. In this step, the order of processing all the cells is important; preceding from those that are closest to the source location first to those cells that are further away. Therefore, the cells are processed in an order following an expanding wave front from the source location. This first basic step is illustrated in FIG. 1, blocks 16 through 30.

The second basic step of the present method, as illustrated in FIG. 1 in blocks 32 through 42, computes the traveltimes to each grid point inside each cell using traveltime values on the segments surrounding the cell. In this step, the order of processing cells is arbitrary.

Referring now to FIG. 1, a block diagram of the method of the present invention is illustrated. At the first block, block 12, data is received as a velocity model. This model may take any form that is currently used in the art. At block 14, each of the boundaries, cells, and segments of the velocity model are identified. A list is kept of the segments in each cell and what two cells are used by each segment. A flag, called SEG-DONE, is initialized for each segment to zero (0). A value of zero (0) indicates the minimum traveltime has not been computed. A value of one (1) indicates that it has been computed. Another flag, called CELL-DONE, is initialized for each cell to zero (0). A value of zero (0) indicates the minimum traveltime has not been computed. A value of one (1) indicates it has been computed.

At block 16, a preselected source location S is identified and the cell it is contained in is identified. This is called the source cell. Note that the source may be directly on a segment and hence included in two cells, in such case both cells are selected as source cells.

At block 18, a listing is compiled of the near and far segments for each cell with respect to the source location. For each traveltime table, source location segments surrounding each cell are separated into two groups called the near group and the far group. A near segment is one for which a line drawn from the source location to any point in the segment would not encounter any other segment in the cell wall. A far segment is one in which such a line would encounter another segment in the cell wall before reaching the far segment.

Figure 2:
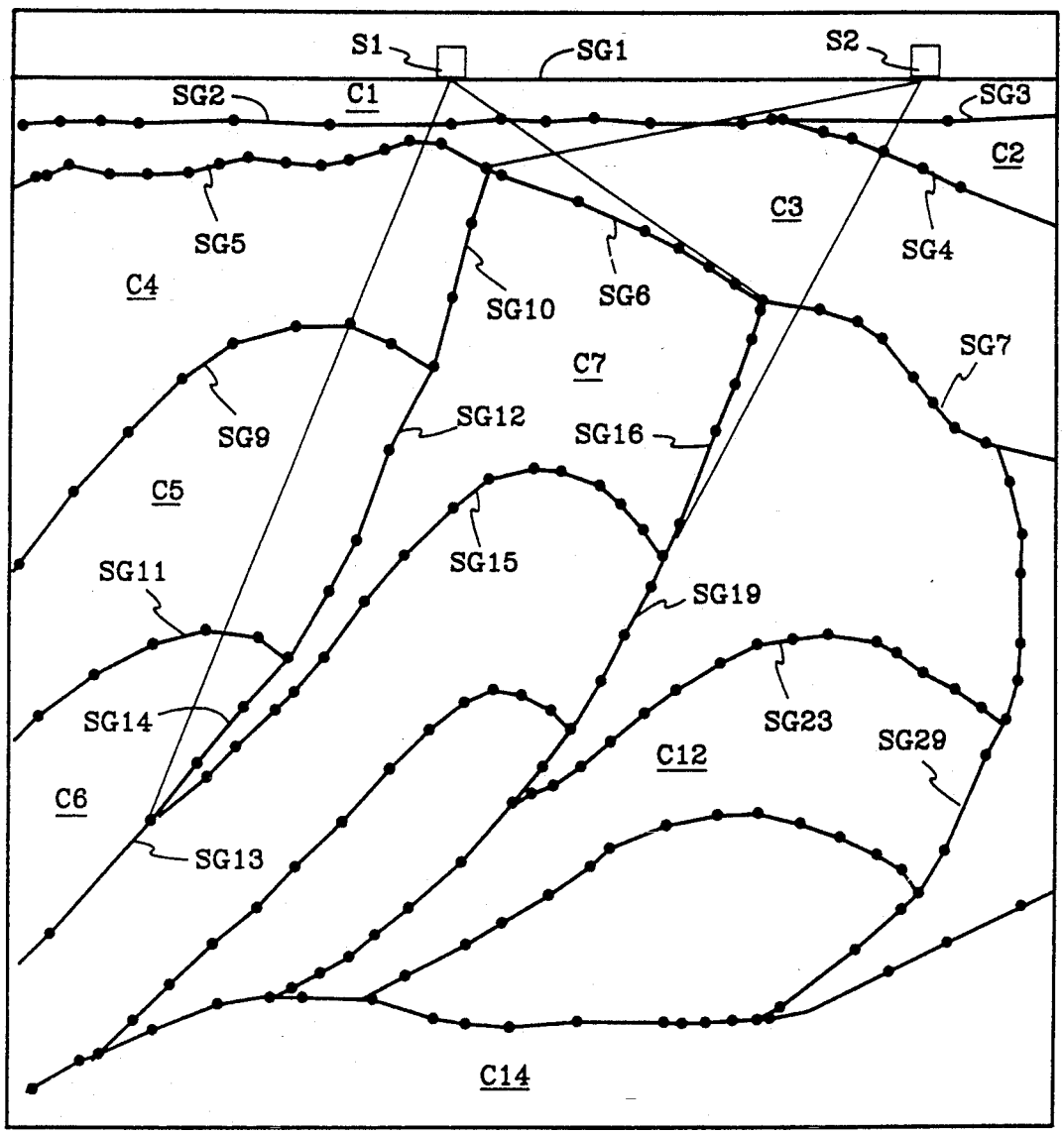
FIG. 2 is a graphical representation of a complex velocity model having several geologic horizons defined as boundaries.

FIG. 2, which is a graphical illustration of a complex velocity model having several geologically defined boundaries and identified cells, illustrates the near and far segments for two different source locations. As illustrated, for the source at S1, the near segments for cell 7 are segment 6, segment 10, segment 12, and segment 14. For the source at S1, the far segments for cell 7 are segment 15 and segment 16. For the source at S2, the near segments for cell 7 are segment 6 and segment 16. For the source at S2, the far segments for cell 7 are segment 10, segment 12, segment 14, and segment 15. Note that if a segment is a far segment of one cell, it is the near segment of the other cell that shares that segment.

At block 20 the traveltime and incidence angle is calculated from S to each point X in each segment of the source cell. Note that every segment in the source cell is a near segment. Using Snell's law and the velocity on each side of each segment, the refraction angle is determined for each segment. If the incidence angle is past the critical angle for this segment the flag SEG-DONE is set to a negative one ($-1$), indicating that the segment should no longer be used in the search for minimum traveltimes. After the traveltimes are determined the flags CELL-DONE and SEG-DONE are modified to indicate that this cell and these segments have been completed.

At block 22, the next cell is chosen for processing. This cell will be called the current cell. If the flag CELL-DONE is set at zero (0) this means that cell's traveltimes have not yet been determined. If the flag SEG-DONE is equal to a one (1) or a negative one (−1) for each near segment in this cell, the traveltimes to each of the near segments in that cell's wall has been determined. The traveltimes to the near segments are compared and the smallest is selected to determine the next cell. For all cells in which the flag CELL-DONE is equal to zero (0) and SEG-DONE is equal to 1 or −1, the cell with the smallest traveltime to any one of its near segments for which SEG-DONE is equal to one (1) is chosen as the current cell as illustrated in block 22. The flag SEG-DONE equal to one (1) excludes those segments for which the incident angle is past the critical angle.

For each point $X_f$ in each far segment in the current cell as illustrated in FIG. 1 in blocks 24 and 26, the minimum traveltime from points on the near segments to the point $X_f$ is determined. At block 28 the point on the near segment that gives this minimum travel time is a new secondary source S. The direction from S to $X_f$ must agree with the direction of the refraction angle calculated at S. The incidence angle is determined at $X_f$. If the incidence angle is greater than the critical angle, the flag SEG-DONE is set to a negative one (−1) to indicate that it should no longer be used in the search for minimum travel times. Otherwise, Snell's law and the velocity on each side of the segment is used to determine the wave front refraction angle on the other side of the segment and the flag SEG-DONE is set to one (1). Once the traveltimes are completely determined for all far segments in the current cell then the flag CELL-DONE is modified and blocks 22 through 30 are repeated for each cell until all cells have been processed.

Blocks 32 through 42 illustrate the second basic step of the present method wherein traveltimes are computed at each grid point from the traveltimes on the surrounding segments. In this basic step the cells may be processed arbitrarily. At block 32 the model is plotted on a two dimensional grid. A cell is selected at block 34. At block 36 the traveltimes are calculated from the near segments on the cell wall to each grid point within the cell. The minimum traveltimes are selected for each grid point within the cell. The minimum travel time is computed from the near segments on the cell wall to each grid point $X_g$ for which the flag SEG-DONE is equal to one (1). The location of this minimum is called the secondary source location $S_g$, as illustrated in block 38. The direction from $S_g$ to $X_g$ must agree with the direction of the refraction angle calculated at $S_g$. After the traveltime to the first grid point within a cell is found, the search for minimum traveltimes for nearby grid points can be restricted to segment points near the previous secondary source location $S_g$. At block 42, the second basic step is repeated until the minimum traveltimes for all grid points within each cell have been determined. At block 44 both basic steps are repeated for the next preselected source location.

This method can be compared to ray tracing methods where the rays pass all chosen segment points in addition to all the grid points, which means a very large number of rays in complex velocity models. This is because a ray that passes one of these points will in general not pass many other such points. In this present method a small number of rays enter every cell at the chosen incidence points. These rays are interpreted within the cell so that every exit point and every grid point within the cell is hit. Thus ray segments, not the whole ray, are locally generated where they are needed, making computation in complex velocity models very efficient.

Figure 3A:
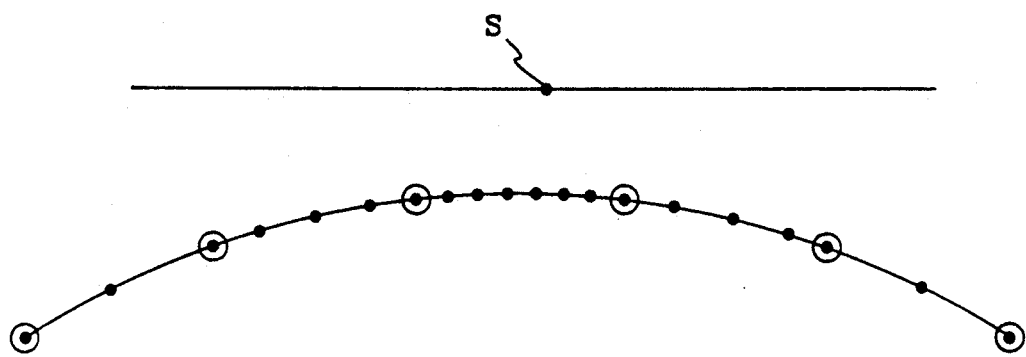
FIG. 3A illustrates boundary layers which are very thin wherein an increased number of sampling points are added.
Figure 3B:
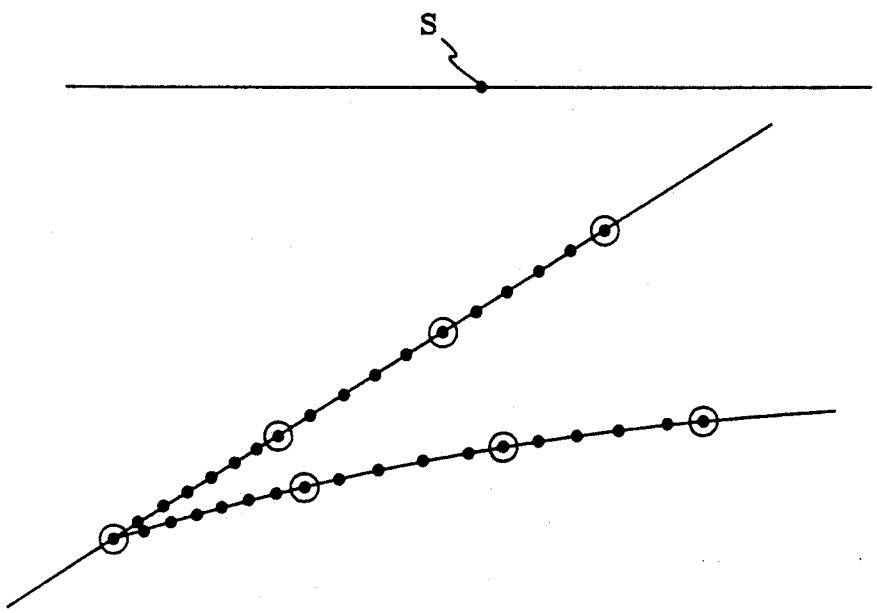
FIG. 3B illustrates reflection boundaries that intersect at a near sharp corner wherein additional sampling points are added.

Certain problems have occurred in previous methods involving sampling layer boundaries on a vertical grid that are solved by the present method. First, when the boundary is nearly vertical, crossing only a few vertical grid lines, it is sampled at just a few points, then travel times computed using these locations are inaccurate. In the present method additional sampling points are added thereby enabling adequate spacing of sampling points for determining correct travel times. Second, for very thin layers (including the case of very shallow water layers) or near sharp corners, the lower boundary needs to be sampled even more closely so that Snell's law can be verified. FIGS. 3A and 3B illustrate these two problems and the solutions as set out by the present method wherein more points are added so that the boundaries are sufficiently sampled.

While there has been illustrated and described a particular embodiment of the present invention which has been limited to two dimensions, it will be appreciated that numerous changes and modifications will occur to those skilled in the art, particularly in extension of the present invention to three dimensions, and it is intended in the appended claims to cover all those changes and modifications which fall within the true spirit and scope of the present invention.

What is claimed is:

1. A method for generating travel times for travel time tables for application in depth migration comprising the steps of:
   receiving a velocity model;
   identifying cells in the velocity model, each cell having a given velocity structure and having cell walls which are divided into segments defined by subsurface boundaries;
   determining a traveltime to each sample point on said segments proceeding from those cells that are closest to a preselected source location first to those cells that are further away in an expanding wave front from the source location;
   plotting the model on a two dimensional grid; and
   generating the traveltimes to grid points within said cells using sample points on the surrounding segments as secondary sources and determining traveltimes from said secondary sources to each grid point.

2. The method according to claim 1 wherein said step of determining a traveltime to each sample point on said segments includes the steps of:
   identifying a source cell which contains a preselected source;
   determining the traveltime, incidence angle and refraction angle from the source to each point in each segment of the source cell;
   identifying near segments and far segments in each cell with respect to the source location;
   selecting a second cell wherein any one of said second cell's near segments includes the smallest traveltime, excluding those segments for which the incidence angle is past the critical angle;
   generating the traveltimes from points on the near segments of said second cell to each point in each far segment of said second cell;
   comparing the traveltimes from all points on the near segments to each point in each far segment;

selecting the minimum traveltime from points on the near segments to each point on the far segments which determines a secondary source to be used for generating traveltimes to a third cell; and repeating the steps of selecting a cell, generating traveltimes and selecting minimum traveltimes until traveltimes to all sample points on all segments on all cells have been determined.

3. The method according to claim 1 wherein said step of generating the traveltimes to grid points within said cells includes the steps of:

identify a source location;

identify near segments and far segments in each cell with respect to the source location;

selecting a cell;

generating traveltimes from near segments of the cell to a grid point within the cell, excluding those near segments for which the incidence angle is past the critical angle;

selecting a secondary source location which is located at the point on the near segment which has the smallest traveltime to said grid point;

generating traveltimes to surrounding grid points within the cell using segment points near said secondary source location; and repeating the steps of selecting a cell, generating traveltimes and selecting minimum traveltimes until traveltimes to all grid points within the cells have been determined.

4. A method for generating travel times for travel time tables for application in depth migration comprising the steps of:

receiving a velocity model;

identifying cells in the velocity model, each cell having a given velocity structure and having cell walls which are divided into segments defined by subsurface boundaries;

identifying a source cell which contains a preselected source;

determining the traveltime, incidence angle and refraction angle from the source to each point in each segment of the source cell;

identifying near segments and far segments in each cell with respect to the source location;

selecting a second cell wherein any one of said second cell's near segments includes the smallest traveltime, excluding those segments for which the incidence angle is past the critical angle;

generating the traveltimes from points on the near segments of said second cell to each point in each far segment of said second cell;

comparing the traveltimes from all points on the near segments to each point in each far segment;

selecting the minimum traveltime from points on the near segments to each point on the far segments which determines a secondary source to be used for generating traveltimes to a third cell;

repeating the steps of selecting a cell, generating traveltimes and selecting minimum traveltimes until traveltimes to all sample points on all segments on all cells have been determined;

plotting the model on a two dimensional grid;

selecting a cell;

generating traveltimes from near segments of the cell to a grid point within the cell, excluding those near segments for which the incidence angle is past the critical angle;

selecting a secondary source location which is located at the point on the near segment which has the smallest traveltime to said grid point;

generating traveltimes to surrounding grid points within the cell using segment points near said secondary source location; and repeating the steps of selecting a cell, generating traveltimes and selecting minimum traveltimes until traveltimes to all grid points within the cells have been determined.

* * * * *